United States Patent [19]

Beelen et al.

[11] Patent Number: 5,716,426
[45] Date of Patent: Feb. 10, 1998

[54] METHODS OF PROCESSING ALUMINIUM DROSS AND ALUMINIUM DROSS RESIDUE INTO CALCIUM ALUMINATE

[75] Inventors: Christiaan M. J. M. Beelen; Willem Van Der Knoop, both of Alkmaar, Netherlands

[73] Assignee: Hoogovens Staal B. V., Ijmuiden, Netherlands

[21] Appl. No.: 620,381

[22] Filed: Mar. 22, 1996

[30] Foreign Application Priority Data

Mar. 24, 1995 [NL] Netherlands .................. 9500579

[51] Int. Cl.$^6$ .................................................. C01F 7/16
[52] U.S. Cl. ............................................. 75/672; 423/600
[58] Field of Search ............................... 75/672; 423/600

[56] References Cited

U.S. PATENT DOCUMENTS

| | | | |
|---|---|---|---|
| 5,135,565 | 8/1992 | Gens | 75/672 |
| 5,385,601 | 1/1995 | Kemeny et al. | 75/748 |

FOREIGN PATENT DOCUMENTS

| | | |
|---|---|---|
| 01099153 | 9/1983 | European Pat. Off. . |
| 9110629 | 7/1991 | WIPO . |
| 9508516 | 3/1995 | WIPO . |

OTHER PUBLICATIONS

"Market Opportunities for the Alcan Plasma Dross Residues," by Raymond Breault et al, Light Metals 1995 Month Unavail.

*Primary Examiner*—Melvyn Andrews
*Attorney, Agent, or Firm*—Watson Cole Stevens Davis, P.L.L.C.

[57] ABSTRACT

The processing of aluminium dross containing Al and $Al_2O_3$ originating from aluminium production, comprises the steps of separating aluminium from the dross to produce a dross residue and reacting the dross residue at a temperature above 1360° C. with a calcium-oxygen compound to form calcium aluminate as an at least partially melted material. To obtain a product specially suitable for use in steel-making, the calcium aluminate is rapidly cooled to form a glassy solid product. The two steps may be performed in the same vessel, which has a suitable refractory lining.

13 Claims, No Drawings

5,716,426

METHODS OF PROCESSING ALUMINIUM DROSS AND ALUMINIUM DROSS RESIDUE INTO CALCIUM ALUMINATE

FIELD OF THE INVENTION

This invention relates to methods of processing aluminium dross, and aluminium dross residue, into a calcium aluminate. It further relates to the use of the calcium aluminate produced by the method in steel-making.

DESCRIPTION OF THE PRIOR ART

Aluminium dross occurs in, for example, the processing or production of aluminium when the metal comes into contact with air while in the molten state. Dross comprises usually aluminium oxide, aluminium nitride, other (metal) oxides and minerals originating from scrap or contaminants from melting furnaces. The dross also contains metallic aluminium in a concentration which depends on the process from which the dross originates. It is known to process the dross first by separating aluminium from it to obtain aluminium dross residue, which is also known as non-metallic product (NMP).

Formerly NMP originating from known dross processing techniques in rotating salt furnaces was put in a landfill as waste. Such disposal is increasingly facing environmental problems or is even banned, not least because salts can leach from the NMP and pass into the soil below.

WO 91/09978 discloses a method for at least in part recouping metallic aluminium as a valuable component from dross with a relatively low content of metallic aluminium, in which ammonia and other valuable products may be produced from the NMP (or dross with a low content of metallic aluminium). These products can be ammonium salts, aluminate solutions or aluminium hydrate. Any residue still remaining may be used as base material for refractory materials or dumped as inert waste.

WO 91/10629 proposes using the NMP in the production of a refractory product. The NMP is mixed with a metal oxide and this mixture is then calcined to allow a refractory product to form. Examples given are the production of spinel ($MgAl_2O_4$) and mullite by the addition of MgO and silica respectively. Addition of CaO is also mentioned without further detail.

More recently, it has been proposed that aluminium dross is used to make calcium aluminate, which is a material used in the steel industry as an additive which reduces sulphur content of the steel (see McGannon, "The Making, Shaping and Treating of Steel", United Steel Corporation, 10th edition, 1985, 489–90). In "Light Metals", 1995, pages 823-7, there is reported a disclosure at the TMS Annual Meeting, Las Vegas, February 1995, in which the conversion of aluminium dross to a non-metallic residue by a plasma process is described. The non-metallic residue is sintered with calcium carbonate in a rotary kiln at temperatures below the eutectic temperature of calcium aluminate (1360° C.) to give a dust-free product.

U.S. Pat. No. 5,385,601 describes removal of aluminium metal from aluminium dross by crushing, sizing and mixing, followed by melting of the resultant product with a flux containing calcium oxide and silicon oxide. A flux containing 81.5% CaO and 10.8% $SiO_2$ is used to make calcium aluminate for the steel industry. $SiO_2$ is presumably employed to reduce the melting temperature. The melting temperature was 1490°–1520° C. The calcium aluminate contains about 16% $SiO_2$. Because of the presence of $SiO_2$ the off-gas stream from the melting furnace contains compounds which must be condensed.

SUMMARY OF THE INVENTION

An object of the invention is to improve the suitability of the calcium aluminate formed from aluminium dross for its use in steel-making.

Another object is to improve the process of making calcium aluminate.

According to the invention there is provided a method in which aluminium dross residue is heated at above 1360° C. with a calcium-oxygen compound, to produce an at least partially melted material which is then rapidly cooled so as to obtain a glassy solid product. This product has been found to be especially effective in steel production for achieving a high-quality slag layer on the steel bath. By use of the product of the invention, a rapid melting and well-flowing slag is formed, which is advantageous for the necessary slag bath reaction kinetics, in other words for the sake of the diffusion towards and retention into the slag layer of substances leaving the steel bath.

The calcium aluminate melt is preferably rapidly cooled by pouring it onto a cooled surface, e.g. a cooled steel sheet. It may be cooled in a cooled granulation drum, which allows large-scale processing.

The material added to the aluminium dross residue to form the melt preferably contains no silica. Preferably the calcium-oxygen compound used is lime. Lime is easily obtained and relatively inexpensive. Residues containing lime are also satisfactory.

Preferably the weight ratio of $Al_2O_3$—CaO in the product is approximately 1:1. This ensures that a molten phase forms for the compound in the intended temperature range.

Preferably the heating temperature is lower than 1600° C. This achieves the effect that besides energy advantages the refractory lining of the reaction vessel does not become unduly overloaded.

The invention further provides a method of processing aluminium dross in which in a first step aluminium is separated from the dross to form a dross residue, and in a second step the dross residue is treated as above. In this method the dross residue (NMP) is preferably contacted with the calcium-oxygen compound in the same vessel as that in which Al is separated from the dross. In this manner a high energy efficiency can be obtained. NMP with for example 2% metallic Al and approximately 25% AlN has an energy content of approximately 200 MJ/tonne.

The metallurgical vessel for carrying out this two-step method preferably has a wear lining of a refractory material based on high grade MgO, $Al_2O_3$, the spinel $MgO.Al_2O_3$ or a refractory Si compound or a mixture of two or more of these. By providing the vessel with a wear lining of such a material it has been found feasible to carry out alternately the operation of dross processing for separating metallic aluminium, and subsequently in the same vessel the operation of NMP processing without the inconveniences that might be expected with such alternating operation under atmospheres differing for each type of operation because this kind of wear lining is chemically resistant to molten calcium-aluminate. The mixture of MgO, and/or $Al_2O_3$, and/or Si-based materials can be in all suitable ratios. A binder may be employed.

Besides the alternating non-oxidizing and oxidizing atmospheres for processing dross and NMP respectively in one and the same metallurgical vessel, the wear lining of the vessel is also attacked by wear, and by abrasion in particular, when processing the dross into NMP. From experiments it has been learned that Si-based refractory materials in particular are resistant to both oxidizing and non-oxidizing conditions, are abrasion and impact resistant and resistant to both high temperatures and thermal shocks, and have a particular good resistance to molten aluminium and/or magnesium and a good chemically resistance to molten calcium-aluminate.

The Si-based refractory material can be applied in various ways, for example as moulded bricks, or unshaped as ramming mix, or castable or gunning mix.

The base material for the refractory material comprises Si-compounds such as SiC, $Si_3N_4$, or a solid solution containing the elements Si, Al, O and N (known as sialon), or mixtures thereof.

The individual Si-based compounds or mixtures thereof may be bonded in a chemical or ceramic manner, or with a cement bonding, or resin-bonding or pitch-tar bonding.

When required the additives carbon or graphite and/or metallic Al and/or Mg can be added, depending on the type of bonding used. In chemically bonded refractory materials the metallic Al and/or Mg is added during production of said article in a range of 0.05 to 10% by weight, and the graphite may be added in a range of 5-20% by weight.

When the refractory material is applied in an unshaped manner, the content of Si-based compounds should preferably be over 40% by weight. In this manner ease of construction and sufficient wear and heat resistance are combined.

When the refractory material is applied as shaped articles, the content of Si-based compounds should preferably be over 70% by weight.

The first step, of removal of aluminium from dross, may be carried out in various known ways, for example as described in EP-A-0690139.

In the invention, preferably the aluminium dross and the aluminium dross residue employed are salt-free, in particular substantially free of NaCl and KCl. This reduces processing problems and provides a superior product for use in steel making.

The invention is also embodied in the use of the calcium-aluminate produced according to the method of the invention as an additive in steel production, particularly as a slag additive in ladle steel-making.

DESCRIPTION OF AN EMBODIMENT

The invention will now be illustrated by reference to the results of several experiments.

In a universal clay graphite crucible a mixture of approximately 10 kg dross residue (NMP, i.e. salt-free aluminium dross from which aluminium metal has largely been removed by a process such as that of EP-A-0690139) with a composition of:
$Al_2O_3$ 59.6%
AlN 17.6%
Al metallic 3.6%
MgO 9.3%
$SiO_2$ 1.9%
and approximately 12 kg $Ca(OH)_2$ was mixed in such a proportion that following calcination of $Ca(OH)_2$ into CaO and oxidation of AlN into $Al_2O_3$ a ratio of $Al_2O_3$: CaO of approximately 1:1 was obtained. The mixture was heated in an electric resistance furnace to 1350° C. (solid), 1400° C. (plastic), 1430° C. (thickly liquid), 1450° C. (difficult to cast) and 1500° C. (pourable). Subsequently the melt was poured and cooled rapidly in three ways, in water, to stationary air and onto a water-cooled steel sheet respectively.

The calcium-aluminates obtained in this way were assessed for suitability for use as artificial slag in the steel production, with the following results:

| cooling to ↓ | produces → | melting rate | flow behaviour | suitability |
| --- | --- | --- | --- | --- |
| water | | – | – | – |
| air | | □ | + | □ |
| water-cooled steel sheet | | ++ | + | + |

The symbols mean:
– Not suitable
□ Poor suitability
+ Suitable
++ Very suitable

It appears that cooling by pouring into water produces a foamed calcium-aluminate which impairs the transfer of heat and that melting does not occur quickly enough.

When cooled in air the resultant calcium-aluminate melts reasonably promptly and then flows out well.

When quenching by casting onto a water-cooled steel sheet, a glassy calcium-aluminate of excellent suitability was obtained.

These experimental results show that when prepared correctly calcium-aluminate produced from NMP is highly suitable for use as artificial slag in steel production. On an industrial scale processing may take place in the reaction vessel and the desired cooling may be obtained by means of casting onto a cooled sheet or into for example a granulation drum. The selection depends on the scale of size of the process.

In order to determine whether a vessel for processing dross provided with a magnesite-carbon refractory wear lining would be resistant to a subsequent NMP processing process being carried out, a melting crucible from magnesite-carbon refractory material holding molten calcium aluminate was kept in molten state at 1500° C. for 4 hours under slightly reducing conditions. No reaction or deterioration whatsoever occurred.

What is claimed is:

1. A method of processing aluminum dross residue resulting from the removal of aluminum from aluminum dross and the aluminum dross residue is substantially free of NaCl and KCl, comprising the steps of reacting the dross residue at a temperature T above 1360° C. with lime to form calcium aluminate as an at least partially melted material, and rapidly cooling said calcium aluminate to form a glassy solid product.

2. A method according to claim 1 wherein rapid cooling of said calcium aluminate is performed by pouring it onto a cooled surface.

3. A method according to claim 1 wherein the weight ratio of $Al_2O_3$ to CaO in said material at said temperature T is about 1:1.

4. A method according to claim 1 wherein said temperature T is lower than 1600° C.

5. A method according to claim 1 wherein said rapid cooling of said calcium aluminate is performed in a cooled granulation drum.

6. A method of processing aluminum dross containing Al and $Al_2O_3$, and originating from aluminum production, comprising the steps of separating aluminum from said dross to produce a dross residue, said aluminum dross and said aluminum dross residue are substantially free of NaCl and KCl, reacting said dross residue at a temperature T above 1360° C. with a calcium oxygen compound to form calcium aluminate as an at least partially melted material, and rapidly cooling said calcium slate so as to obtain it in the form of a glassy solid product, wherein said step of separating aluminum from said dross and said step of reacting said dross residue and said calcium-oxygen compound are carried out in the same vessel and said vessel has a wear lining comprising a refractory material based on a refractory Si compound or with a mixture of at least one component selected from the group comprising MgO, $Al_2O_3$, and spinal $MgO.Al_2O_3$.

7. A method according to claim 6 wherein said refractory material is based on MgO.

8. A method according to claim 6 wherein said refractory material is based on at least one of SiC, $Si_3N_4$ and sialon.

9. A method according to claim 8 wherein said refractory material is in the form of pre-shaped articles containing at least 70% by weight in total of at least one of SiC, $Si_3N_4$, sialon and a mixture of two or more thereof.

10. A method according to claim 8 wherein said refractory material is one applied to said wear lining in unshaped form and contains at least 40% by weight in total of at least one of SiC, $Si_3N_4$, sialon and a mixture of two or more thereof.

11. A method according to claim 6 wherein said refractory material also contains a binder.

12. A method according to claim 6 wherein said refractory material also contains graphite in an amount of 5 to 20% by weight.

13. A method according to claim 6 wherein said refractory material also contains at least one of metallic Al and metallic Mg in an amount of 0.05 to 10% by weight.

\* \* \* \* \*